(12) United States Patent
Spirgatis et al.

(10) Patent No.: US 8,430,727 B2
(45) Date of Patent: Apr. 30, 2013

(54) DEVICE FOR PRODUCING BLOWN FILMS

(75) Inventors: Jens Spirgatis, Hennef (DE); Andreas Böhm, Troisdorf (DE)

(73) Assignee: Reifenhäuser GmbH & Co. KG Maschinenfabrik, Troisdorf (DE)

( * ) Notice: Subject to any disclaimer, the term of this patent is extended or adjusted under 35 U.S.C. 154(b) by 361 days.

(21) Appl. No.: 12/452,319

(22) PCT Filed: Jun. 25, 2008

(86) PCT No.: PCT/EP2008/005116
§ 371 (c)(1),
(2), (4) Date: Dec. 24, 2009

(87) PCT Pub. No.: WO2009/000509
PCT Pub. Date: Dec. 31, 2008

(65) Prior Publication Data
US 2010/0104677 A1    Apr. 29, 2010

(30) Foreign Application Priority Data
Jun. 28, 2007 (DE) .......................... 10 2007 030 260

(51) Int. Cl.
*B29C 47/90* (2006.01)

(52) U.S. Cl.
USPC ............. 452/66; 425/72.1; 425/380; 425/467

(58) Field of Classification Search .................... 425/66, 425/72.1, 380, 461, 467
See application file for complete search history.

(56) References Cited

U.S. PATENT DOCUMENTS

| | | | |
|---|---|---|---|
| 3,335,208 A * | 8/1967 | Harris | ............................ 264/566 |
| 3,355,770 A | 12/1967 | Augustin | |
| 3,749,540 A * | 7/1973 | Upmeier | .................... 425/326.1 |
| 3,852,386 A | 12/1974 | Behr | |
| 4,170,624 A | 10/1979 | Dawson | |
| 5,425,216 A | 6/1995 | Ausnit | |
| 5,441,395 A | 8/1995 | Planeta | |
| 6,338,453 B1 | 1/2002 | Meyer | |
| 6,447,278 B1 * | 9/2002 | Arruda | ......................... 425/72.1 |

(Continued)

FOREIGN PATENT DOCUMENTS

| DE | 23 40 259 | 3/1975 |
|---|---|---|
| DE | 39 37 772 A1 | 5/1990 |
| JP | 56 017227 | 2/1981 |
| JP | 2001 162667 | 6/2001 |

OTHER PUBLICATIONS

Co-Pending U.S. Appl. No. 12/924,080, filed Sep. 20, 2010; inventor Helmut Meyer; title Winding Device.

*Primary Examiner* — Yogendra Gupta
*Assistant Examiner* — Joseph Leyson
(74) *Attorney, Agent, or Firm* — Pauley Petersen & Erickson

(57) ABSTRACT

A device for producing blown films, including an extrusion device generating a tubular film and a flattening device, associated with the tubular film, having two flattening elements, arranged on diametrically opposite zones of the tubular film and adjustable in relation to each other at an acute angle, for transforming a cross-section of the tubular film, which is first circular, then oval, to a double-layer film web. This invention has lateral guide elements for the areas of the tubular film that are not affected by the flattening elements and are arranged between the flattening elements and are associated with the tubular film and the lateral guide elements have an adjustable contour.

17 Claims, 2 Drawing Sheets

U.S. PATENT DOCUMENTS

| | | |
|---|---|---|
| 6,612,829 B2 | 9/2003 | Rübhausen |
| 6,666,998 B2 | 12/2003 | Berghaus et al. |
| 6,752,348 B2 | 6/2004 | Dreckmann et al. |
| 6,954,983 B2 | 10/2005 | Fröschl et al. |
| 6,991,758 B2 | 1/2006 | Krumm et al. |
| 7,025,303 B2 | 4/2006 | Meyer |
| 7,036,763 B2 | 5/2006 | Böhm et al. |
| 7,093,785 B2 | 8/2006 | Meyer et al. |
| 7,384,254 B2 | 6/2008 | Rübhausen et al. |
| 7,445,443 B2 | 11/2008 | Meyer |
| 7,479,003 B2 | 1/2009 | Wedell et al. |
| 2002/0086071 A1 | 7/2002 | Rübhausen |
| 2002/0180111 A1 | 12/2002 | Steinberg |
| 2004/0166192 A1 | 8/2004 | Stommel |
| 2010/0136152 A1 | 6/2010 | Spirgatis et al. |
| 2010/0143516 A1 | 6/2010 | Spirgatis et al. |
| 2010/0295207 A1 | 11/2010 | Thewes et al. |

* cited by examiner

DEVICE FOR PRODUCING BLOWN FILMS

BACKGROUND OF THE INVENTION

1. Field of the Invention

This invention relates to a device for producing blown films out of a thermoplastic plastic.

2. Discussion of Related Art

There are a wide variety of known devices of the above-mentioned type. The functional principle is based on the fact that the melted mass of thermoplastic plastic manufactured by at least one extruder is extruded from an annular exit opening of a die and blown into a tube, which is then folded by a flattening device, conveyed between squeezing rollers, and then supplied to a winding device.

In the simplest case, the flattening device is of two flattening elements, which are arranged in diametrically opposite regions of the tubular film and are adjustable at an acute angle in relation to each other, similar to an inverted V or an A, and whose distance from each other, when viewed in the exit direction of the tubular film, continuously decreases. The flattening elements have a number of guides such as strips, rollers, or brushes, which act on a circumference of the tubular film so that the tubular film, which is initially cylindrical, is gradually flattened, passing through an oval shape with continuously changing diameters, into the form of a double-layered film that is folded at its longitudinal edges.

If the oval cross-sectional shape of the gradually flattened tubular film, which shape takes form starting from the initially cylindrical tubular film, is viewed in the flattening device, then the tubular film, in the region of the larger diameter of the oval cross section at which the folded longitudinal edges of the tubular film finally form, is largely left alone during the flattening because it is not in contact with guide and is not guided by the flattening elements of the flattening device. This can lead to problems with regard to product stability, freedom from wrinkles, and the like.

U.S. Pat. No. 4,170,624 discloses transforming an initially cylindrical tubular film into a rectangular cross section in a special flattening device and then flattening it into a double layer. The intent of this is to avoid mechanical stress on the tubular film during the flattening and resulting changes in the properties profile of the tubular film.

Because of the straight arrangement of the brushes, rollers, or strips used as the guide for the tubular film, which has up to now been the default arrangement in the prior art, it is not possible to laterally guide the tubular film at a plurality of points in an ascending fashion. On the contrary, one result of the existing form is that only an insufficient point-by-point contact is possible and thus, particularly in reversing movements of the flattening device and/or a withdrawal device for the tubular film, which is situated after the squeezing rollers in order to improve the transverse thickness profile, the film starts to form slight wrinkles that run all the way through the completed roll and reduce the quality. This situation is clearly in need of improvement.

SUMMARY OF THE INVENTION

In order to solve this problem, this invention proposes lateral guide elements inside the flattening device, which feature an adjustable contour, for example one that is approximately arc-shaped or S-shaped.

In this case, the lateral guide elements can be of a support structure with adjusting means and at least one support arm fastened to the support structure, with the at least one support arm supporting guide, fastened to holding forks for example, for the tubular film.

The guides themselves can be rollers or drums of a suitable plastic such as CFK, silicone, or also aluminum. It is also possible to provide roller brushes or to provide plates with a porous, preferably microporous, surface from which a current of air emerges in order to produce an air cushion between the plate and the tubular film, to ensure a contact-free guidance. Microporous layers of this kind preferably have an average pore size of 5 to 100 µm.

In the case of rotating rollers or drums, it is preferable to ensure a particularly smooth running.

The support structure is preferably of a plurality of support legs, which are connected to one another in articulating fashion and can be individually adjusted by suitable adjusting drive units in accordance with the desired path of the tubular film as it passes through the flattening device. In this case, one or more support arms for holding guides can be fastened to each support leg. At least one support arm is provided for each support leg.

Other adjusting possibilities can be provided by securing the guide to the support arms, in a way that allows them to pivot around a pivot axis extending in the exit direction of the tubular film.

The adjustment of the support legs, which are connected to one another in articulating fashion and extend from one another in segmented fashion, can be embodied in various ways, not only with respect to the angle enclosed between adjacent support legs, but also with respect to the distance from the respective opposing lateral guide element in order to adapt to the diameter of the tubular film. According to another embodiment of this invention, it is also possible for the individual support legs to be longitudinally adjustable, such as by a suitable telescoping mechanism, which offers additional degrees of freedom for adapting to the desired contour of the tubular film to be flattened.

By embodying the lateral guide element according to this invention with a large number of support legs, it is possible to emulate arc-shaped desired contours of the tubular film with a high degree of approximation, particularly if the support arms fastened to the individual support legs and the holding forks, which are for the guide and are fastened to these arms, are adjustable, for example vertically adjustable, laterally adjustable, and angularly adjustable.

The guides are preferably situated in the vicinity of the lateral guide elements provided according to this invention so that they support the tubular film over the largest possible regions of its circumference and, together with the flattening elements, support the tubular film in a definite, three-dimensional fashion.

According to another embodiment of this invention, each lateral guide element, in its upper end region close to the subsequent squeezing rollers of the device, can have a guide blade that encloses an outside of the longitudinal edge that forms during the flattening of the tubular film, and thus ensures an exact embodiment of the edge fold of the flattened tubular film. The guide blade guides the longitudinal edge of the tubular film precisely into a nip between the squeezing rollers, which grasp the tubular film after the flattening device and convey it onward. This guide blade also can be produced from suitable plastics or also aluminum, for example, if it comes into contact with the tubular film or can also be equipped with a porous or microporous surface oriented toward the tubular film, for example to permit a supplied current of air to emerge and to produce an air cushion for a contact-free guidance of the tubular film.

Also in this connection, a "microporous surface" is understood to be a surface with an average pore size of 5 to 100 μm.

The distance to the subsequent squeezing rollers should be selected to be small and is preferably adjustable, thus preferably permitting a definite guidance of the longitudinal edge of the tubular film all the way to the roller nip of the squeezing rollers.

The adjustment of the individual support legs can, for example, be executed with a high degree of positioning precision by spindle drive units or other suitable drive units. Each support leg can also have a separate adjusting drive unit. The adjusting drive units can also be centrally connected to one another.

BRIEF DESCRIPTION OF THE DRAWINGS

Other embodiments and details of this invention are explained in view of an exemplary embodiment shown in the drawings, wherein.

DETAILED DESCRIPTION OF THE INVENTION

Figure 1:
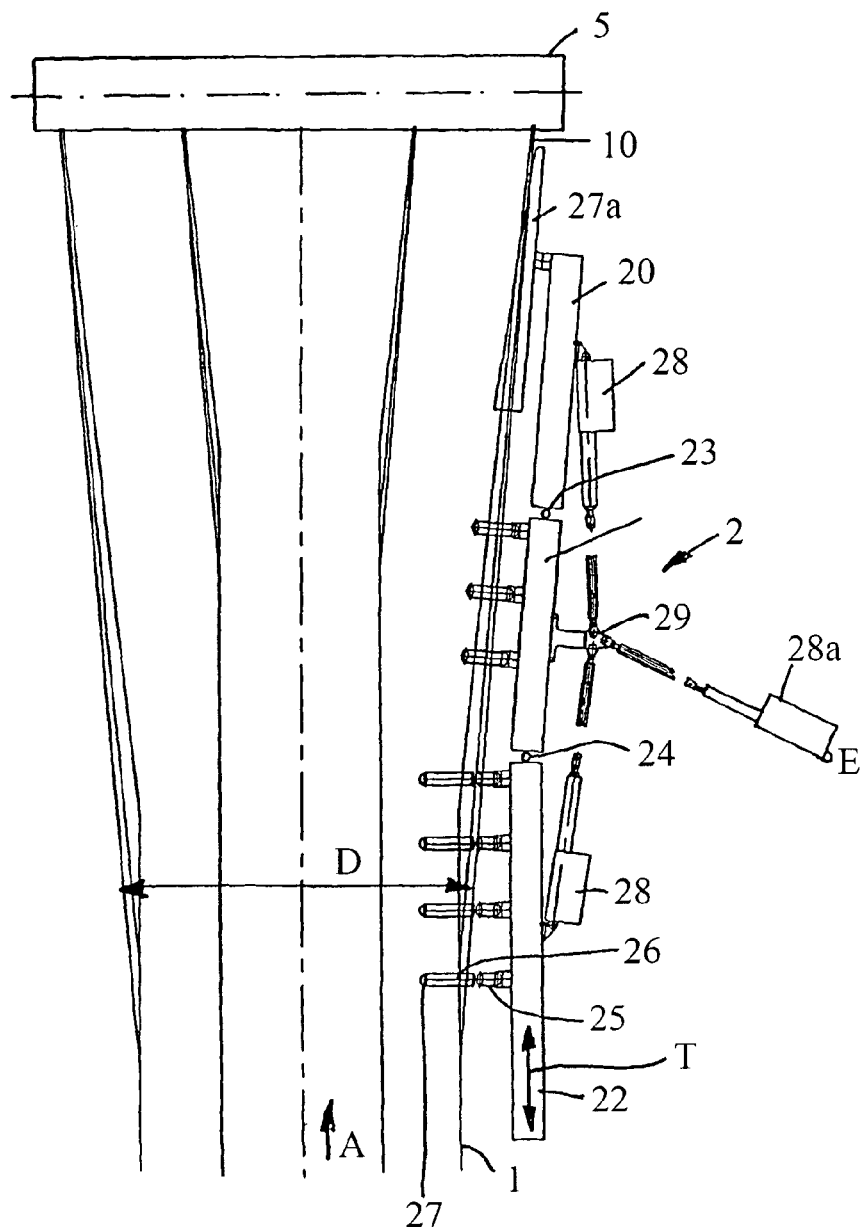
FIG. 1 is a schematic side view of a device according to one embodiment of this invention.

FIG. 1 is a schematic view of a tubular film 1, which is manufactured in a known manner, guided vertically upward in an exit direction A out of an extrusion device, gradually folded into a flat tubular film by flattening elements, not shown in detail, of a flattening device, and inserted into a nip between two squeezing rollers 5. The drawing also shows a lateral guide element 2, which is part of the flattening device and is also provided on the opposite side, symmetrical to the central longitudinal axis of the tubular film 1.

Figure 2:
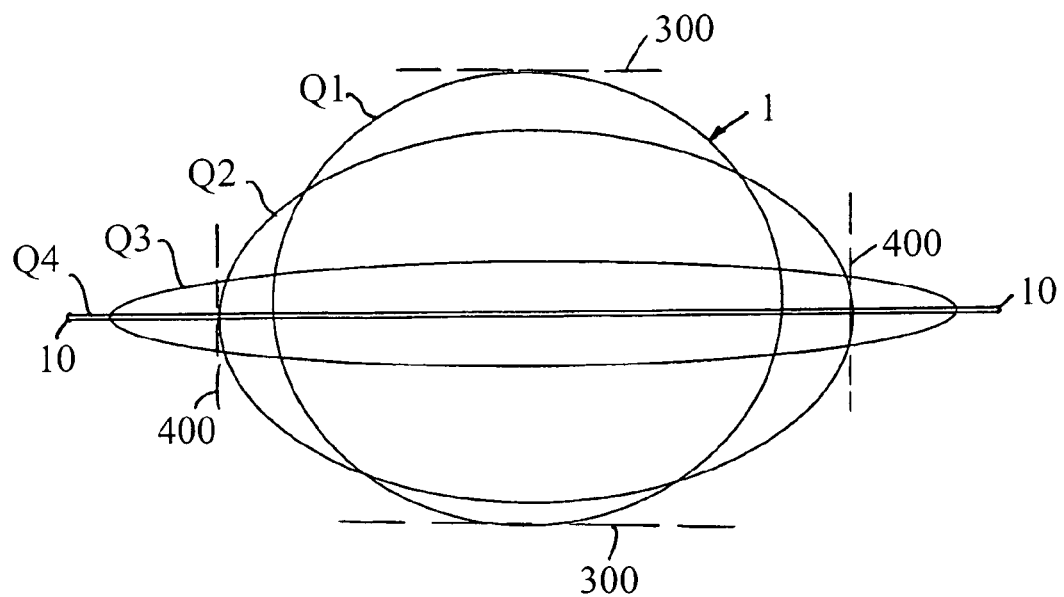
FIG. 2 shows a cross-sectional shape of a tubular film that changes as the tubular film is flattened.

Through the action of the flattening elements, which according to the depiction in FIG. 2, engage a region labeled with the reference numeral 300 of the initially cylindrical tubular film 1, such as with a circular cross section Q1, the tubular film 1 is gradually transformed, passing through oval cross sections that are labeled Q2 and Q3, by way of example, into a flattened double-layered film web with a cross section Q4 and edge folds 10.

During this flattening process from the cross section Q1 to the cross section Q4, the lateral guide elements 2 guide the tubular film 1 continuously in the region 400 of the larger diameter, such as between the flattening elements labeled with the reference numeral 300, in the region of the forming edge folds 10 and the adjacent regions of the tubular film 1.

Each lateral guide element 2 comprises, according to FIG. 1, a support structure with three support legs labeled with the reference numerals 20, 21, 22, which are connected to one another, such as in a chain, by articulating joints 23, 24.

Each of the support legs 20, 21, 22 supports support arms 25 to which are secured guides or guide means 27 for the tubular film 1, which are oriented toward the tubular film 1, are embodied in the form of CFK rollers, for example, and contact the surface of the tubular film 1, guiding it precisely in the desired contour.

Figure 3:
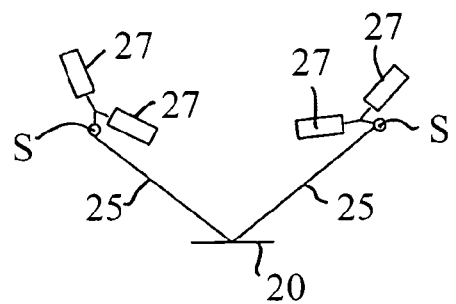
FIG. 3 is a view of a part of a lateral guide element embodied according to this invention.

As shown in FIG. 3, the free end of each support arm 25 can have pairs of guide means 27 that are supported, if necessary, in an articulating fashion by a pivot axis S extending in the entry direction of the tubular film 1 in order to adapt optimally to the circumference of the tubular film 1.

In lieu of guide means in the form of rollers, the upper support segment 20, viewed in the exit direction A, has a guide blade 27a that grasps the outside of the forming edge fold 10 of the flattened tubular film 1 and ensures a precise guidance of it all the way to the nip between the squeezing rollers 5, which are positioned or situated congruently one behind the other in FIG. 1.

Because of the articulating connection between the individual support legs 20, 21, 22, it is possible to adjust them relative to one another with respect to the enclosed angle in order to adapt to the desired contour of the tubular film. For this purpose, independent drive units such as spindle drive units 28 are provided, which in the exemplary embodiment shown, engage the support leg 20 and the support leg 22 while the support leg 21 positioned between them has a cantilever 29 that is engaged by the drive unit 28. The drawing also shows an additional engaging arm of a drive unit 28a, which directly engages the cantilever 29. With this configuration and through actuation of the individual drive units 28, 28a, it is possible within broad boundaries to adjust the angular orientation of the succeeding support arms and thus of the guide means for the tubular film 1 that are fastened to them and in particular, it is possible to optimally reproduce the arc-shaped edge curvatures that form on the tubular film 1 to be flattened and thus to achieve a significantly more precise guidance that results in a significantly improved quality of the flattened tubular film 1.

Alternatively, it is also possible to provide a separate drive unit 28 for each support leg 20, 21, 22, without connecting these drive units to one another.

The support legs 20, 21, 22 can be adjusted independently of each other in the direction of the diameter D of the tubular film and can also each telescope in the arrow direction T, for example are embodied as longitudinally adjustable.

In lieu of the three support legs 20, 21, 22 shown here, it is also possible to provide only two such support legs or more than three support legs and to provide them with corresponding drive units. In another embodiment, each support leg has at least one support arm 25 for a guide means.

The invention claimed is:

1. A device for producing blown films, comprising an extrusion device that produces a tubular film (1) and having a flattening device associated with the tubular film (1) that has two flattening elements situated in diametrically opposite regions of the tubular film and that are adjustable at an acute angle in relation to each other so that an initially circular cross section of the tubular film is transformed, passing through oval cross sections, into a double-layered film web, for regions of the tubular film (1) left free by the flattening elements, lateral guide elements (2) situated between the flattening elements, associated with the tubular film (1), and having an adjustable contour, wherein the lateral guide elements (2) comprise a support structure equipped with adjusting mechanism, at least one support arm (25) is fastened to the support structure, the at least one support arm (25) supports guides (27) for the tubular film (1), and the support structure has a plurality of support legs (20, 21, 22) connected to one another in articulating fashion and adjustable by adjusting drive units (28, 28a).

2. The device as recited in claim 1, wherein the guides (27) are of rollers or drums, brush rollers, or plates on which it is possible to act with a current of air in order to produce an air cushion.

3. The device as recited in claim 2, wherein each of the support legs (20, 21, 22) has a separate adjusting drive unit (28, 28a).

4. The device as recited in claim 3, wherein the adjusting drive units (28, 28a) of the legs (20, 21, 22) are connected to one another.

5. The device as recited in claim 4, wherein an angle is adjustable between succeeding ones of the support legs (20, 21, 22) of a lateral guide element (2) and/or a distance is adjustable to the other lateral guide element (2).

6. The device as recited in claim 5, wherein the lateral guide elements (2) are longitudinally adjustable in an axial direction (A) of the tubular film (1).

7. The device as recited in claim 6, wherein an end of each lateral guide element (2) oriented away from the extrusion device has a guide blade (27a) that grasps an edge fold (10) that forms on the tubular film (1) during the flattening of the tubular film (1).

8. The device as recited in claim 7, wherein it is possible to lay the guide blade (27a) against the tubular film (1) or the guide blade (27a) produces an air cushion for a contact-free guidance of the tubular film (1).

9. The device as recited in claim 8, wherein the guide blade (27a) is adjustably secured to the lateral guide element (2).

10. The device as recited in claim 1, wherein each of the support legs (20, 21, 22) has a separate adjusting drive unit (28, 28a).

11. The device as recited in claim 1, wherein the adjusting drive units (28, 28a) of the legs (20, 21, 22) are connected to one another.

12. The device as recited in claim 1, wherein an angle is adjustable between succeeding ones of the support legs (20, 21, 22) of a lateral guide element (2) and/or a distance is adjustable to the other lateral guide element (2).

13. The device as recited in claim 1, wherein the lateral guide elements (2) are longitudinally adjustable in an axial direction (A) of the tubular film (1).

14. The device as recited in claim 1, wherein an end of each lateral guide element (2) oriented away from the extrusion device has a guide blade (27a) that grasps an edge fold (10) that forms on the tubular film (1) during the flattening of the tubular film (1).

15. The device as recited in claim 14, wherein it is possible to lay the guide blade (27a) against the tubular film (1) or the guide blade (27a) produces an air cushion for a contact-free guidance of the tubular film (1).

16. The device as recited in claim 7, wherein the guide blade (27a) is adjustably secured to the lateral guide element (2).

17. A device for producing blown films, comprising:
an extrusion device that produces a tubular film (1);
a flattening device associated with the tubular film (1) that has two flattening elements situated in diametrically opposite regions of the tubular film and that are adjustable at an acute angle in relation to each other so that an initially circular cross section of the tubular film is transformed, passing through oval cross sections, into a double-layered film web; and
lateral guide elements (2) for regions of the tubular film (1) left free by the flattening elements, each situated between adjacent ends of the flattening elements and associated with the tubular film (1), the lateral guide elements (2) comprising a support structure including a plurality of support legs (20, 21, 22) connected to one another in articulating fashion and adjustable by adjusting drive units (28, 28a), at least one support arm (25) extending from each of the support legs (20, 21, 22), and a film guide (27) supported on each of the at least one support arm (25) in articulating fashion.

* * * * *